United States Patent
Hakola et al.

(10) Patent No.: US 10,750,465 B2
(45) Date of Patent: Aug. 18, 2020

(54) METHOD AND APPARATUS FOR CONFIGURATION AGNOSTIC RADIO SYNCHRONIZATION

(71) Applicant: Nokia Technologies Oy, Espoo (FI)

(72) Inventors: Sami-Jukka Hakola, Kempele (FI); Jorma Johannes Kaikkonen, Oulu (FI); Mihai Enescu, Espoo (FI); Lars Dalsgaard, Oulu (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 31 days.

(21) Appl. No.: 16/336,489

(22) PCT Filed: Sep. 26, 2017

(86) PCT No.: PCT/IB2017/055861
§ 371 (c)(1),
(2) Date: Mar. 26, 2019

(87) PCT Pub. No.: WO2018/060858
PCT Pub. Date: Apr. 5, 2018

(65) Prior Publication Data
US 2020/0213963 A1 Jul. 2, 2020

Related U.S. Application Data

(60) Provisional application No. 62/402,435, filed on Sep. 30, 2016.

(51) Int. Cl.
*H04W 56/00* (2009.01)
*H04W 16/28* (2009.01)
*H04W 72/04* (2009.01)

(52) U.S. Cl.
CPC ......... *H04W 56/003* (2013.01); *H04W 16/28* (2013.01); *H04W 56/001* (2013.01); *H04W 72/046* (2013.01)

(58) Field of Classification Search
CPC . H04W 56/003; H04W 56/001; H04W 16/28; H04W 72/046
See application file for complete search history.

(56) References Cited

U.S. PATENT DOCUMENTS

2013/0089065 A1 4/2013 Koorapaty et al.
2014/0198772 A1 7/2014 Baidemair et al.
(Continued)

FOREIGN PATENT DOCUMENTS

WO 2011/121374 A1 10/2011
WO 2015/114562 A1 8/2015

OTHER PUBLICATIONS

"New SID Proposal: Study on New Radio Access Technology", 3GPP TSG RAN Meeting #71, RP-160671, Agenda Item: 9.1, NTT Docomo, Mar. 7-10, 2016, 8 pages.
(Continued)

*Primary Examiner* — Curtis A Alia
(74) *Attorney, Agent, or Firm* — Nokia Technologies Oy

(57) ABSTRACT

In accordance with an example embodiment of the present invention, methods and apparatus are provided to allow exchange of synchronization sequences in a manner substantially agnostic of a configuration of the transmitter by provisioning of an in indication whether or not synchronization sequences may be combined with other synchronization sequences.

20 Claims, 6 Drawing Sheets

(56) References Cited

U.S. PATENT DOCUMENTS

| | | | |
|---|---|---|---|
| 2016/0044618 A1* | 2/2016 | Sheng | H04W 56/001 370/329 |
| 2018/0270770 A1* | 9/2018 | Shim | H04J 11/0083 |
| 2018/0310267 A1* | 10/2018 | Liu | H04W 56/0005 |

OTHER PUBLICATIONS

"3rd Generation Partnership Project; Technical Specification Group Radio Access Network; Study on Scenarios and Requirements for Next Generation Access Technologies;(Release 14)", 3GPP TR 38.913, V0.4,0, Jun. 2016, pp. 1-35.

"On Synchronization Signal Transmission for NR", 3GPP TSG-RAN WG1 #86 Bis, R1-16xxxx, Agenda item: x.x.x,x, Nokia, Oct. 10-14, 2016, 7 pages.

International Search Report and Written Opinion received for corresponding Patent Cooperation Treaty Application No. PCT/IB2017/055861, dated Feb. 19, 2018, 18 pages.

"On the Synchronization Signal Design Principle in NR", 3GPP TSG-RAN WG1 #86bis, R1-1610287, Agenda item: 8.1.5.1, Nokia, Oct. 10-14, 2016, 5 pages.

"On Requirements and Design of SS Burst Set and SS Block Index Indication", 3GPP TSG-RAN WG1 Meeting #88, R1-1703092, Agenda item: 8.1.1.1.2, Nokia, Feb. 13-17, 2017, 15 pages.

"Verizon 5G TF; Air Interface Working Group; Verizon 5th Generation Radio Access; Physical layer procedures (Release 1)", Verizon, Cisco, TS V5G.213 v1.0, Jun. 2016, pp. 1-43.

"Verizon 5G TF; Air Interface Working Group; Verizon 5th Generation Radio Access; Physical channels and modulation(Release 1)", Verizon, Cisco, TS V5G.211 V1.3, Jun. 2016, pp. 1-79.

Office action received for corresponding Vietnam Patent Application No. 1-2019-01406, dated May 16, 2019, 1 page of office action and 1 page of translation available.

Extended European Search Report received for corresponding European Patent Application No. 17855109.9, dated Apr. 28, 2020, 6 pages.

\* cited by examiner

METHOD AND APPARATUS FOR CONFIGURATION AGNOSTIC RADIO SYNCHRONIZATION

RELATED APPLICATION

This application was originally filed as PCT Application No. PCT/IB2017/055861 on Sep. 26, 2017, which claims priority from U.S. application 62/402,435, filed Sep. 30, 2016.

CROSS REFERENCE TO RELATED APPLICATION

This application claims the benefit of U.S. Provisional Application No. 62/402,435 entitled "METHOD AND APPARATUS FOR CONFIGURATION AGNOSTIC RADIO SYNCHRONIZATION" filed on Sep. 30, 2016, which is incorporated herein by reference in its entirety.

TECHNICAL FIELD

The present application relates generally to providing a configuration agnostic framework for synchronization in a radio system.

BACKGROUND

The design of a next generation air interface, popularly indicated as 5G, as currently initiated by the $3^{rd}$ Generation Partnership Project (3GPP) aims to achieve a single framework addressing a wide variety of usage scenarios, requirements and deployment scenarios as generally described in 3GPP TR38.913.

The 5G air interface is expected to operate using single-beam and multi-beam operation, in scenarios below and above 6 GHz, in licenced and (forward compatible) un-licenced mode. In single-beam operation, a cell would transmit synchronization signals via sector wide beams once in a given periodicity. In single-beam operation supporting coverage enhancement, the synchronization signals should be able to be transmitted in a manner comprising repetition. In multi-beam operation, a cell (which may consists of multiple transmission points) transmits synchronization signals in a beam sweeping manner. Furthermore, in beam sweeping operation, repetition may be relied upon for further coverage enhancements, for example such that synchronization signals transmitted to a certain direction per sweep block are repeated to the same direction in the next sweep block.

As a user equipment (UE) is likely not to be aware of the operation applied at a cell in advance of synchronization to that cell, a need exists for a synchronization procedures that enables a synchronization search performed by the UE to be as agnostic as possible to the operation applied at the cell.

SUMMARY

According to a first aspect of the present invention, there is defined an apparatus comprising at least one processor and at least one memory including computer program code the at least one memory and the computer program code configured to, with the at least one processor, cause the apparatus to perform at least the following: transmit at least one synchronization signal; determine whether the at least one synchronization signal can be combined with at least one other synchronization signal; and transmit an indication whether or not the at least one synchronization signal can be combined with at least one other synchronization signal.

According to a second aspect of the present invention, there is defined an apparatus comprising at least one processor and at least one memory including computer program code the at least one memory and the computer program code configured to, with the at least one processor, cause the apparatus to perform at least the following: receive at least one synchronization signal; receive at least one other synchronization signal; receive an indication whether or not the at least one synchronization signal can be combined with the at least one other synchronization signal; and if the indication indicates that the at least one synchronization signal cannot be combined with the at least one other synchronization signal, not combining the at least one synchronization signal and the at least one other synchronation signal.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
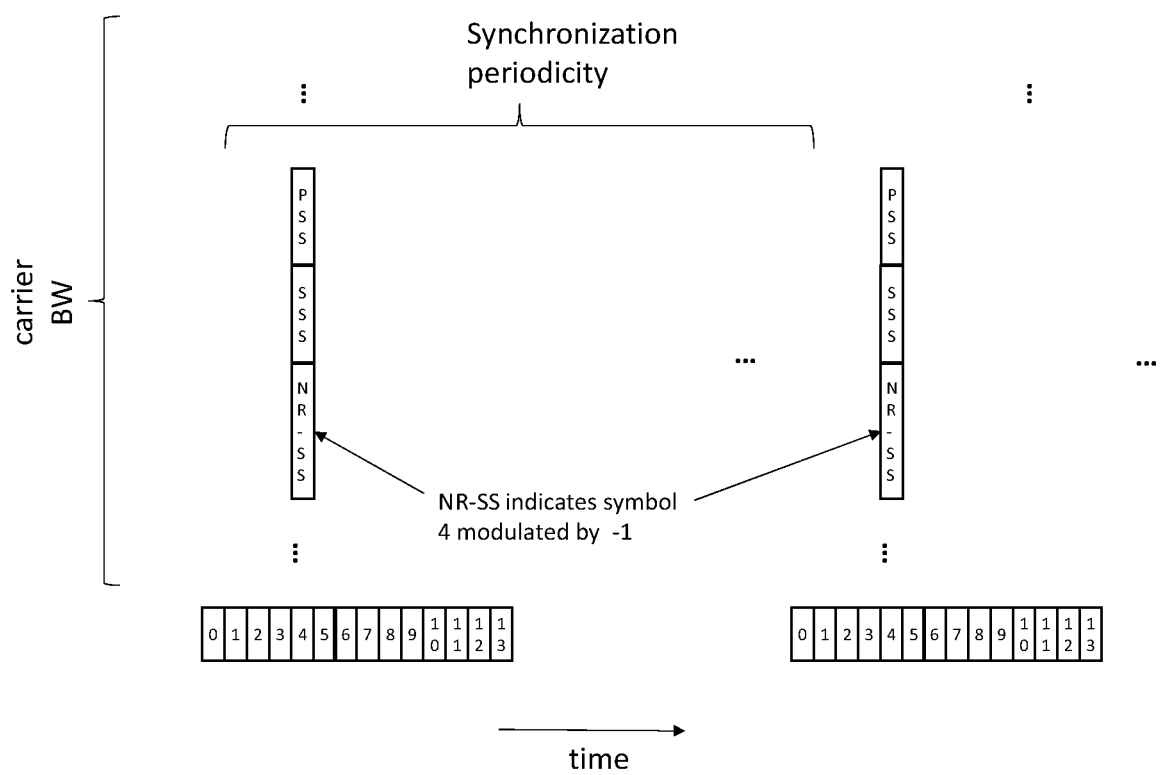
FIG. 1 illustrates an embodiment of a single beam synchronization signal without repetition.

For the purpose of synchronization in an envisioned 5G system, it is generally foreseen that synchronization signals will be transmitted with a certain periodicity to allow synchronization by a receiver. In general, such a transmitter may be embodied in an infrastructure node such as a network transmission point, base station, access point or relay, where the receiver would be typically embodied in a user equipment, such as a mobile phone, tablet, laptop, settop box, television or wristwatch. One skilled in the art will naturally appreciate that in an equivalent manner, such synchronization may achieved in a device-to-device scenario where the transmitter is embodied in a user equipment or in an over-the-air infrastructure node to infrastructure node synchronization where both transmitter and receiver are infrastructure nodes.

Transmission in an envisioned 5G is envisioned to occur on a carrier channel in time/frequency partitioned sources. For simplicity's sake, in the present application time portioned resources will be referred to as symbols, such as orthogonal frequency division multiplexing symbols, grouped in subframes. However, one will appreciate that any other form of time portioned resources and grouping may equivalently be applied without departing from the scope of the invention.

When a receiver attempts initial synchronization to a transmitter, it is generally not aware of particular operation by the transmitter, but rather searches the transmitted signal, or at least part thereof for known sequences or signals, for example a primary synchronization sequence. While synchronization sequences are envisioned to be repeated with a certain synchronization periodicity mutually known by the transmitter and receiver to allow for periodic opportunities to achieve synchronization, occurrences of the synchronization sequences may be transmitted at a significantly higher rate than the synchronization periodicity to allow for example for multi-beam and enhanced overage operation, where such occurences may or may not be combinable depending on the operation of the transmitter. In some other manners of operation of the transmitter, transmit diversity may applied in the form of antenna port changes for at least the synchronization signal, which may make combination of synchronization signals transmitted across different antenna ports undesirable. In accordance with embodiments of the inventions, a transmitter thus provides a receiver with an indication whether at least one synchronization sequences may be advantageously combined with at least one other synchronization sequence. A receiver receiving such an indication may hence be prevented from combining uncombinable synchronization sequences. Naturally, a receiver receiving such an indication may in some embodiments forego combining synchronization sequences indicated as combinable, for example because a combinable synchronization sequence was not received, the quality of an uncombined of an uncombined received synchronization sequence meets a quality threshold etc.

FIG. 1 depicts an embodiment according to the invention where a transmitter operates using a single beam without repetition, for example a single beam without the use of coverage enhancement. As a result, synchronization sequences, depicted as a primary synchronization sequence (PSS) and secondary synchronization sequence (SSS) are regularly spaced with a known synchronization periodicity. A PSS is generally envisioned for providing symbol timing where the SSS is generally envisioned to aid in providing frame timing, where the PSS and SSS jointly are indicative of a physical cell identifier associated with the transmitter. One skilled in the art will naturally appreciate that a different number of synchronization signals with different purposes or a different division of the aforementioned purposes is envisioned within the scope of the invention.

In addition to the PSS and SSS, the transmitter transmits a third synchronization signal, depicted as NR-SS. In an embodiment of the invention as depicted, the NR-SS carries a symbol index within a subframe, here symbol 4 of a 14 symbol subframe, modified by an indication whether or not the associated PSS and SSS may be combined with at least one other PSS and SSS transmitted. As in the depicted embodiment no other PSS and SSS are transmitted within the synchronization periodicity, the indication indicates that such combination may not be performed, here indicated as −1. The symbol index with a subframe provided by the NR-SS allows the receiver to synchronize to the subframe timing. However, in some embodiments, the NR-SS may only carry the indication whether or not the associated PSS and SSS may be combined with at least one other PSS and SSS or at least may not carry the symbol index.

It is envisioned that the SSS and NR-SS each other have a predetermined location in the time/frequency resources or a location with predetermined offset to the PSS, such that detection of PSS informs the receiver of the time/frequency resources in which the SSS and NR-SS may be found. While for simplicity depicted as offset contiguously in the frequency domain, one skilled in the art will appreciate that such an offset may have a time (e.g. symbol) and frequency component where the resources are not necessarily contiguous. For example in very narrow channels, the PSS, SSS and associated NR-SS may be in the same frequency resource in different symbols.

Figure 2:
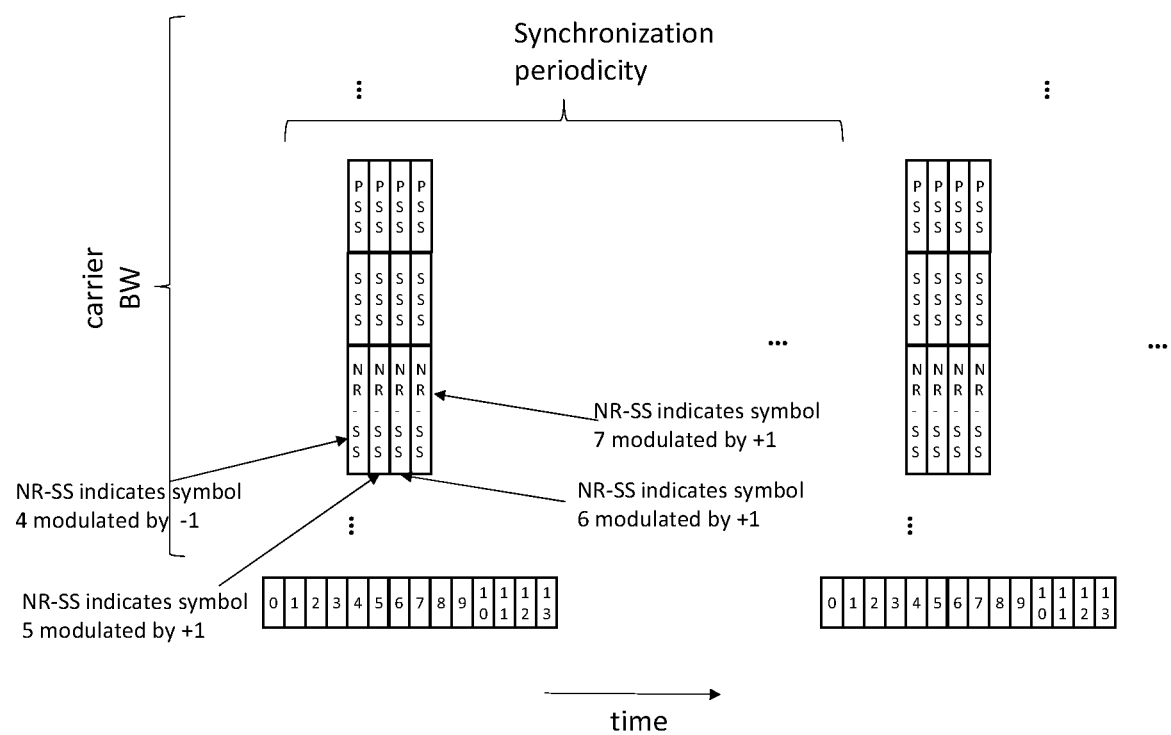
FIG. 2 illustrates an embodiment of a single beam synchronization signal with repetition.

FIG. 2 depicts an embodiment according to the invention where a transmitter operates using a single beam with coverage enhancement. Using coverage enhancement, repetitions are introduced to facilitate a larger cover area by means of combination again. In the depicted example, a repetition rate of 4 is employed by the transmitter, such that each of symbols 4 through 7 comprises a PSS, SSS and NR-SS.

In certain advantageous embodiments of the invention, sets of PSS/SSS/NR-SS synchronization sequences are transmitted in a predefined pattern in the time/frequency resources, such as here in a pattern of consecutive symbols, the knowledge of which allowing the receiver to avoid combining a present PSS and SSS with the wrong other set of PSS and SSS when the set of PSS and SSS with which combination was indicated as combinable was not properly received.

As depicted, each NR-SS carries the symbol index of the symbol in which it is transmitted modified by an indication whether or not the associated PSS and SSS may be combined with at least one other PSS and SSS transmitted. That is, the NR-SS respectively indicate symbol indexes 4 through 7 and the indication indicates whether or not the associated PSS and SSS may be combined with the previous PSS and SSS respectively. The NR-SS in symbol 4 indicates, depicted as −1, that there is no previous PSS and SSS combinable, whereas the NR-SS in symbols 5, 6 and 7 indicate, here depicted as +1, that these may be combined with respective previous PSSs and SSSs. The receiver, having properly received each of the four NR-SS, may therefrom conclude that it can combine the PSSs and SSSs in symbols 4-7. Should for example the SSSs be properly detected, but the NR-SS in symbol 5 prove undecodable, then the receiver may therefrom only conclude that it can combine the PSSs and SSSs in symbols 5-7 as the indication of whether combination of the PSS and SSS in symbol 5 are combinable with those in symbol 4 is lost to the receiver. In general, should a receiver fail to properly decode the indication whether or not the at least one synchronization signal can be combined with at least one other synchronization signal, it may default to an assumption that combining is not allowed. Anticipating this behavior, a transmitter could skip transmission of the indication when the indication would indicate that combination cannot be performed and only transmit the indication when the indication would indicate that combination can be performed.

Figure 3:
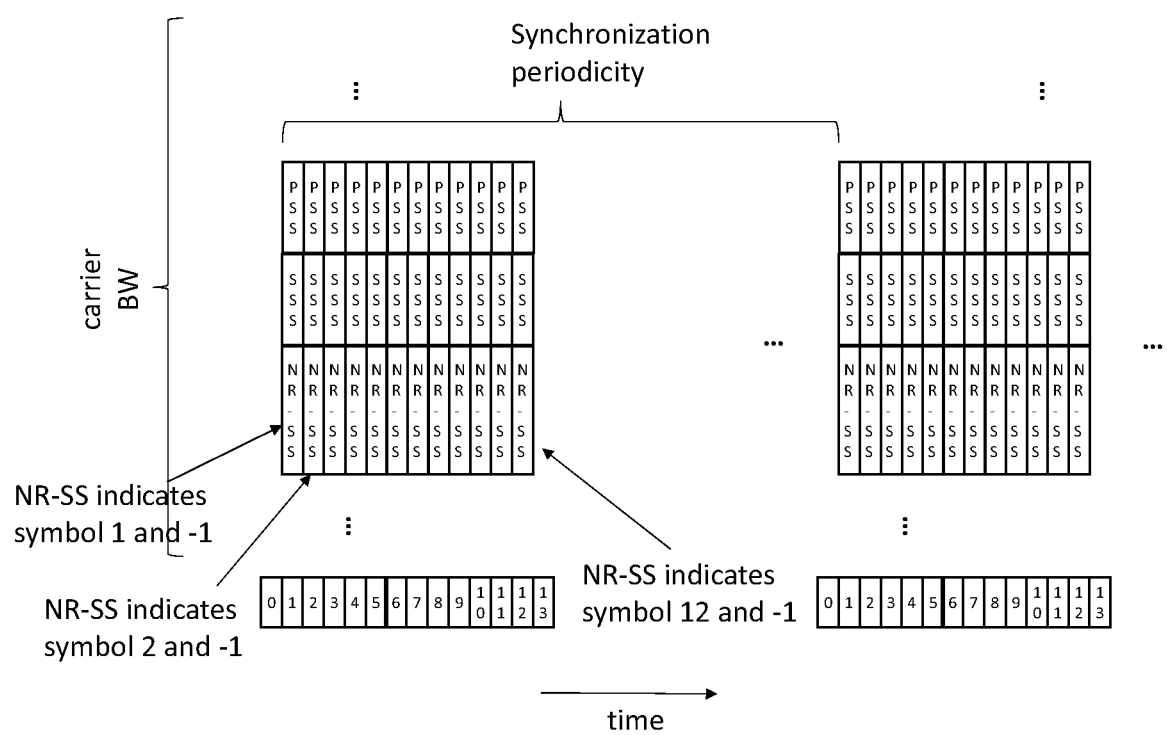
FIG. 3 illustrates an embodiment of a multibeam synchronization signal without repetition.

FIG. 3 depicts an embodiment according to the invention where a transmitter operates using multiple beams without repetition, for example in a scenario where synchronization sequences in different symbols 1-12 are transmitted on different beams of a sweeping beam operation. In such a deployment, combination of synchronization sequences may be undesirable. The transmitter hence indicates, here depicted with −1, in each of the NR-SSs that the associated PSS and SSS are not combinable with a prior PSS and SSS.

Figure 4:
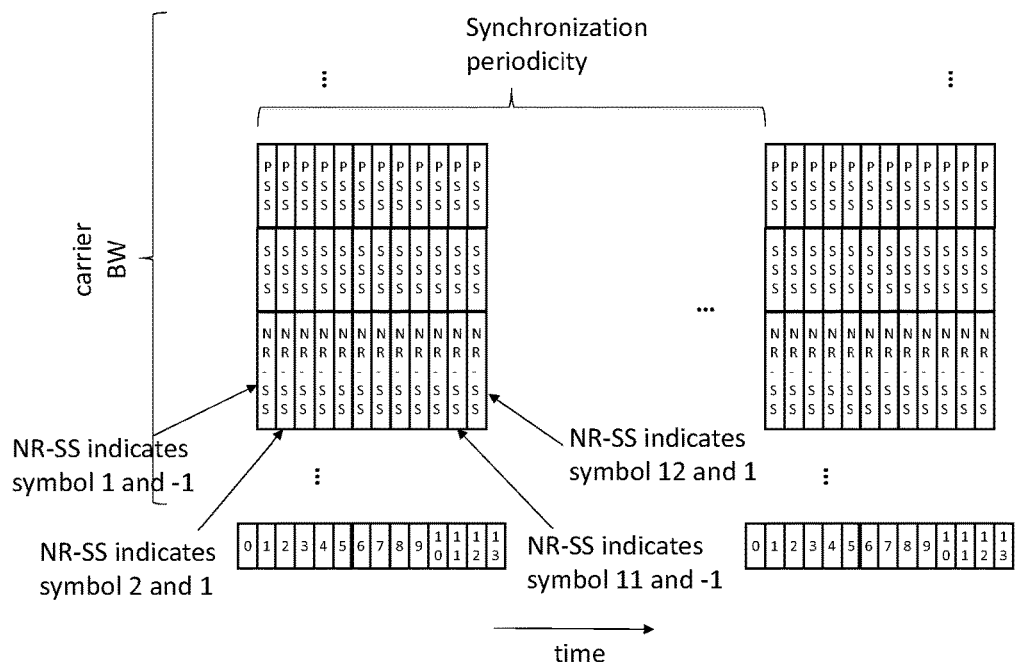
FIG. 4 illustrates an embodiment of a multibeam synchronization signal with repetition.

FIG. 4 by contrast depicts an embodiment according to the invention where a transmitter operates using multiple beams with repetition, for example in a scenario where synchronization sequences in different symbols 1-12 are transmitted on different beams, at least some of which forming at least in part a partial or full sector sector beam or at least some of which employing coverage enhancement. In such a deployment, combination of synchronization sequences may only be desirable for certain synchronization sequences. As particularly depicted, only pairs of consecutive synchronization signals are indicted as combinable by means of indicating in each odd NR-SS that combination is not possible, here indicated by −1 and each even NR-SS that combination with the previous PSS and SSS is possible, here indicated by +1.

The transmitter hence indicates that the receiver may form six pairs of combinable synchronization sequences, which may occur in a transmitter with 6 beams and coverage enhancement factor two, or in twelve beams forming 6 partial sector beams.

Figure 5:
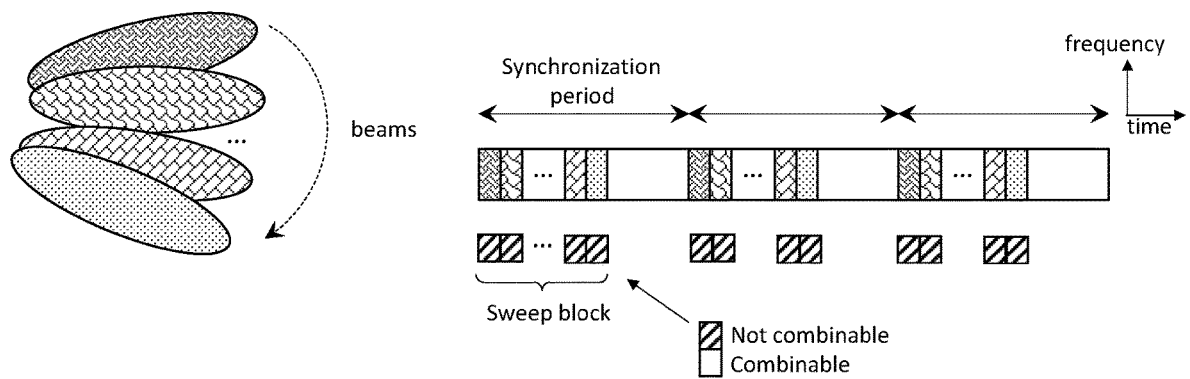
FIG. 5 illustrates an embodiment of a multibeam synchronization signal disabling combining.

FIG. 5 depicts an embodiment of a sweeping beam deployment in which the beams are sequentially transmitted for a finite period and their transmitted synchronization sequences hence sequentially received at the receiver. The time required for the sequential transmission is generally termed a sweep block. Because in a sweeping beam deployment combination of synchronization sequences, here indicated as resource areas patterned corresponding to the depicted beam, from different beams is generally undesirable, the indication whether or not the synchronization sequences are combinable indicates that this is not the case. In the depiction, the sweeping block is contained within a single synchronization period. It is however also envisioned that the sweeping block may extend across multiple synchronization periods, such that the the indication whether or not the synchronization sequences are combinable with at least one other synchronization sequence may indicate the at least one other synchronization sequence to be a at least one synchronization sequence in a different, generally prior or subsequent, synchronization period.

Figure 6:
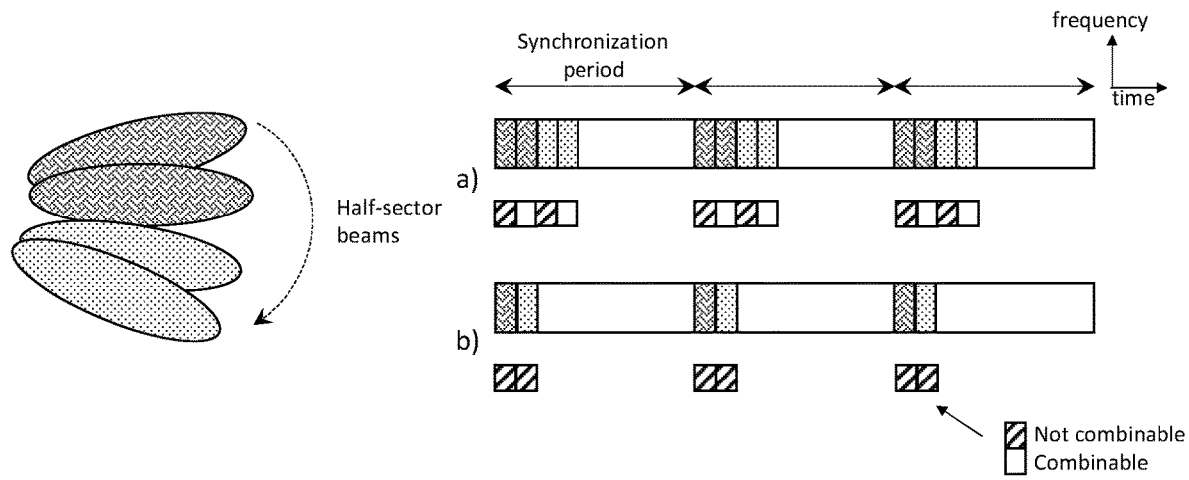
FIG. 6 illustrates an embodiment of a half-sector multibeam synchronization signal enabling combining.

FIG. 6 depicts two embodiments of a transmitter using half-sector beams, in the depicted case using two pairs of two beams. In one of the embodiments, a sweeping block is applied wherein each beam sequentially transmits its synchronization sequences and a corresponding indication whether or not the synchronization signal can be combined with the synchronization signal of at least one other beam. The indication of a first beam of a pair of beams indicates that the synchronization signal of this beam can not be combined with the synchronization signal of a previous beam and the indication of a second beam of the pair of beams indicates that the synchronization signal of this beam can be combined with the synchronization signal of the previous beam. The sequence of indications hence allows the receiver to combine the synchronization signals of the appropriate pair of beams. In the second depicted embodiment, the pair of beams transmit their synchronization signals in the same resources, ensuring reception by the receiver of the synchronization signals of the pair of beams in a combined fashion. Further combination is hence not desired such that the indication whether or not the at least one synchronization signal may be combined with at least one other synchronization signal is set to indicate that combination is not feasible for each of the synchronization sequences.

Figure 7:
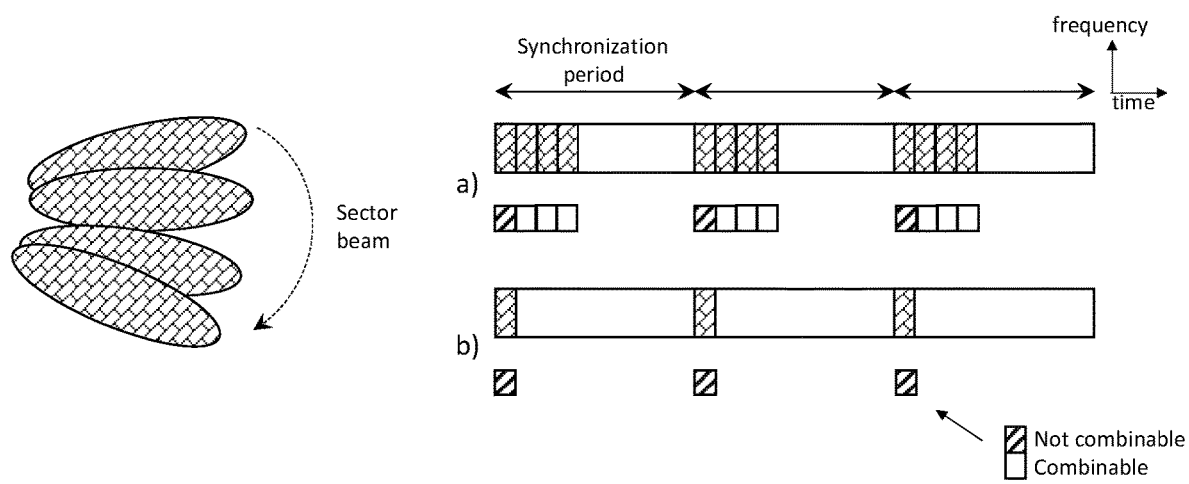
FIG. 7 illustrates an embodiment of a sector beam synchronization signal enabling combining.

FIG. 7 depicts two embodiments of a transmitter using sector beams, in the depicted case using four beams to form a sector. In one of the embodiments, a sweeping block is applied wherein each beam sequentially transmits its synchronization sequences and a corresponding indication whether or not the synchronization signal can be combined with the synchronization signal of at least one other beam. The indication of a first beam of the four beams indicates that the synchronization signal of this beam can not be combined with the synchronization signal of a previous beam and the indication of a second, third and fourth beam of the four beams indicates that the synchronization signal of this beam can be combined with the synchronization signal of the previous beam. The sequence of indications hence allows the receiver to combine the synchronization signals of all four beams, but prevents combination across synchronization periods. In the second depicted embodiment, the four beams transmit their synchronization signals in the same resources, ensuring reception by the receiver of the synchronization signals of all four beams in a combined fashion. Further combination is hence not desired such that the indication whether or not the at least one synchronization signal may be combined with at least one other synchronization signal is set to indicate that combination is not allowed for each of the synchronization sequences. One skilled in the art will naturally appreciate that in an alternate, not depicted, embodiment, each of the indications may indicate that combining is feasible, such that combining across all synchronization periods is enabled. As an alternative, the first indication of the first beam may in periodically be switched from indicating that combining is feasible to indicating that combining is not feasible, such as to enable combining over a limited number of synchronization periods.

It should be appreciated that where the present disclosure refers to a beam, such a beam may be produced by transmission from a single antenna at a single transmitter, a plurality of antennae at a single transmitter or from superposition of transmissions from antennae of a plurality of not necessarily co-located transmitters.

From the description of the embodiments associated with FIGS. 1-7, which one skilled in the art will understand describe only a limited subset of transmitter configurations to which the invention may be applied, it should be appreciated that the provisioning of an indication whether or not at least one synchronization signal can be combined with at least one other synchronization signal allows a receiver to appropriately combine synchronization signals in a manner that is agnostic to the configuration of the transmitter. In addition, the present invention allows the transmitter to flexibly select the symbols on which synchronization sequences are transmitted, in contrast to being limited to a single predefined symbol per subframe.

Furthermore, in the embodiments associated with FIGS. 1-7, the indication whether or not the at least synchronization signal may be combined with at least one other synchronization signal is generally depicted such that the at least one other synchronization signal is a previously transmitted synchronization signal. The indication may however in the alternative be provisioned such that the at least one other synchronization signal is a following transmitted synchronization signal. It should however be noted that the indication for the at least one synchronization signal is specific to the at least one other synchronization signal and not a blanket permission or prohibition to combine the at least one synchronization signal with any other synchronization signal. This should be evident for example from FIG. 4, where the NR-SS for the PSS and SSS of symbol 1 does not permit combining (due to no PSS and SSS existing in symbol 0), yet the PSS and SSS of symbol 1 are permitted to be combined with the PSS and SSS of symbol 2 due to the NR-SS provisioned in symbol 2.

Figure 8:
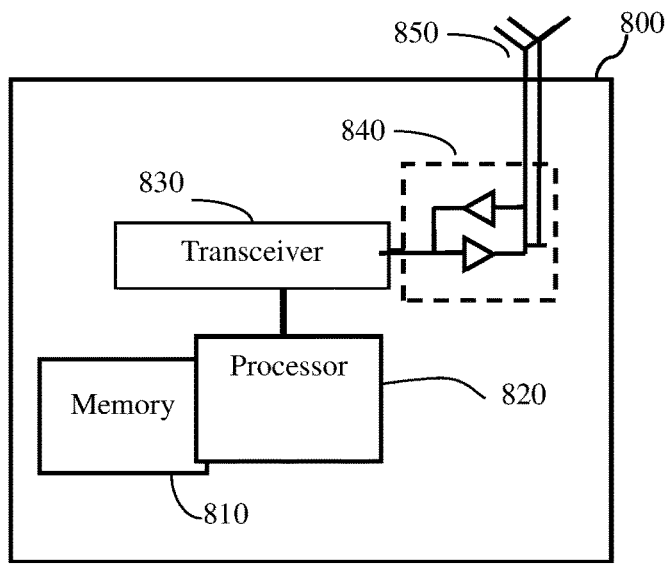
FIG. 8 illustrates an example wireless apparatus in accordance with an example embodiment of the invention.

FIG. 8 depicts a block diagram illustrating an example wireless apparatus (800) in accordance with an example embodiment of the invention. The wireless apparatus may include at least one processor (820), at least one memory (810) coupled to the at least one processor (820) and at least one suitable transceiver (830) having a transmitter and a receiver coupled to the at least one processor (820), coupled to at least one antenna unit (850) through at least one amplifier (840). The at least one memory (810) may store computer programs, which may, when executed by the at least one processor (820), for example in combination with any of the at least one transceiver (830), at least one amplifier (840) and at least one antenna unit (850), perform embodiments of the invention. For example an infrastructure node or user equipment may be embodied in apparatus 800.

Embodiments of the invention may be implemented in software (executed by one or more processors), hardware (e.g., an application specific integrated circuit or field programmable gate array), or a combination of software and hardware. In an example embodiment, the software (e.g., application logic, an instruction set) is maintained on any one of various conventional non-transitory computer-readable media.

Figure 9:
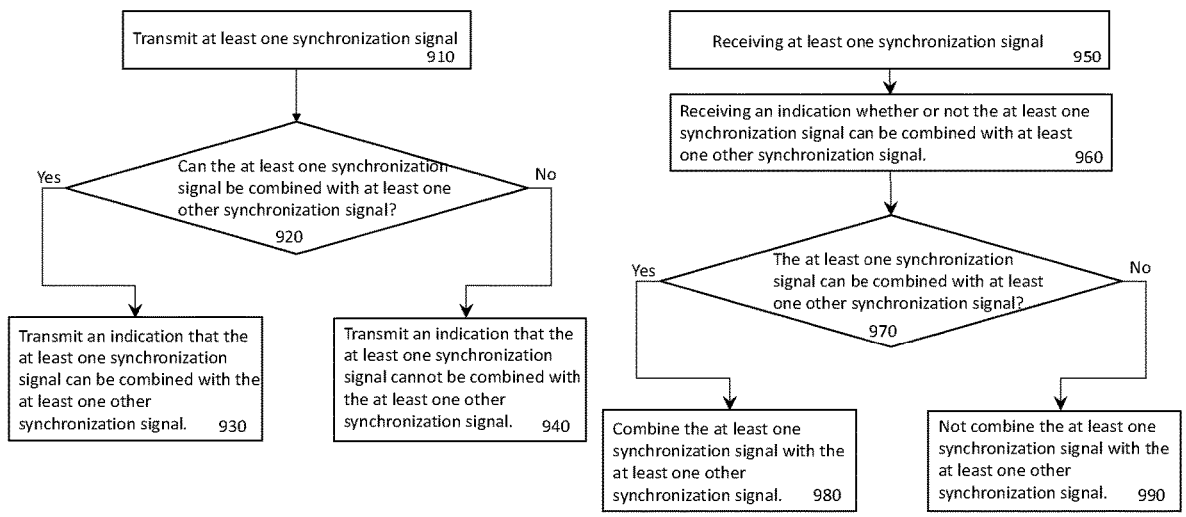
FIG. 9 illustrates transmitter and receiver methods in accordance with an embodiment of the invention.

FIG. 9 depicts embodiments of transmitter and receiver methods in accordance with embodiments of the invention. At 910, a transmitter transmits at least one synchronization signal, for example a PSS and SSS. At 920, the transmitter determines whether the at least one synchronization signal can be combined with at least one other synchronization signal, the at least one other synchronization signal being for example a previously transmitted at least one synchronization signal or at least one synchronization signal to be subsequently transmitted. If the combining is feasible, the transmitter transmits an an indication that the at least one synchronization signal can be combined with the at least one other synchronization signal, whereas if the combining is not desirable, the transmitter transmits an an indication that the at least one synchronization signal cannot be combined with the at least one other synchronization signal. At 950, a receiver receives at least one synchronization signal. At 960, the receiver receives an indication whether or not the at least one synchronization signal can be combined with at least one other synchronization signal. If the indication at 970 indicates that the combining is not feasible, the receiver at 990 does not attempt to combine the at least one synchronization signal with the at least one other synchronization signal. If the indication at 970 indicates that the combining is feasible, the receiver may at 980 combine the at least on synchronization signal with the at least one other synchronization signal. The receiver naturally is only able to perform the combining if the at least one other synchronization signal is also received. Whether the indication, when positive, is to be interpreted as the receiver being allowed or required to perform the combining where possible is both within the scope of the invention. Whether the indication, when negative, is to be interpreted as the receiver being recommended or ordered not to perform the combining is also both within the scope of the invention.

The indication whether or not the at least one synchronization signal can be combined with at least one other synchronization signal may be indicated in various formats. In some embodiments, the indication may be transmitted by itself as a selection of one of two signals, for example one of two sequences or one of two modulation symbol. Where the indication is combined with for example an indication of a symbol index, for example in the form of a Zadoff-Chu sequence or m-sequence reflecting at least the symbol index, the indication may be combined with the indication of the symbol index by applying a mask or phase rotation to the indication of the symbol index. For example, the aforementioned Zadoff-Chu sequence may be multiplied with a mask applying −1 to each element of the Zadoff-Chu sequence (the alternate indication may apply a mask applying +1, which may naturally be skipped), the aforementioned Zadoff-Chu sequence may be subjected to one of two phase rotations or individual elements of the Zadoff-Chu sequence may undergo multiplication with different selected factors or rotation with different phases, such that one of two masks is applied across the sequence.

In certain embodiments according to the invention, a synchronization sequence used for forming the signal indicating whether or not the at least one synchronization signal can be combined with at least one other synchronization signal may be dependent on an identity, for example a physical cell identity as comprised in the at least one synchronization sequence. A receiver would hence preferably extract the identity from the received at least one synchronization sequence and use the extracted identity for performing detection of the indication. Where a physical cell identity is used as the identity, improved separation of signals received in the same resources may hence be achieved. In other embodiments, it may be a mask applied to a base sequence for forming the indication that is dependent on the identity. In one exemplary embodiment for forming a (NR-SS) signal, a Zadoff-Chu sequence is selected that is both dependent on the symbol index in which the signal is to be transmitted and a physical cell identity indicated by the at least one synchronization sequence, further modified by a mask or phase rotation to indicate whether or not the at least one synchronization signal can be combined with at least one other synchronization signal.

Where the at least synchronization sequence is for example a PSS and SSS, a receiver generally would search for PSS, which once found would prompt the receiver to attempt to detect the SSS, where success would prompt extractation of the physical cell identity subsequently used for detecting an NR-SS signal at for example a predetermined resource offset of the SSS and/or SSS resource location for determining from the NR-SS for determining whether or not the PSS and SSS can be combined with at least one other PSS and SSS.

If desired, the different functions discussed herein may be performed in a different order and/or concurrently with each other. Furthermore, if desired, one or more of the above-described functions may be optional or may be combined.

What is claimed is:

1. A method, comprising:
  receiving at least one synchronization signal;
  receiving at least one other synchronization signal;
  receiving an indication whether or not the at least one synchronization signal can be combined with the at least one other synchronization signal; and
  if the indication indicates that the at least one synchronization signal cannot be combined with the at least one other synchronization signal, preventing from combining the at least one synchronization signal and the at least one other synchronization signal.

2. The method of claim 1, wherein the indication whether or not the at least one synchronization signal can be combined with at least one other synchronization signal comprises an indication whether or not the at least one synchronization signal can be combined with a last previously received synchronization signal.

3. The method of claim 1, wherein the indication whether or not the at least one synchronization signal can be combined with at least one other synchronization signal comprises an indication whether or not the at least one synchronization signal can be combined with a first following received synchronization signal.

4. The method of claim 1, wherein receiving the indication further comprises determining the indication from one of the following: one of two predefined signals, one of two predefined masks, and one of two predefined phase rotations.

5. The method of claim 1, wherein the indication whether or not the at least one synchronization signal can be combined with at least one other synchronization signal comprises an indication of one of a symbol index, subframe or timeslot modified by one of a mask or phase rotation to indicate whether or not the at least one synchronization signal can be combined with the at least one other synchronization.

6. The method of claim 1, wherein a pattern of at least one indication whether or not the at least one synchronization signal can be combined with at least one other synchronization signal is indicative of at least one of a single-beam synchronization signal without repetition, a single-beam synchronization signal with repetition, a multi-beam synchronization signal without repetition or a multi-beam synchronization signal with repetition.

7. The method of claim 1, wherein the at least one synchronization signal comprises a primary synchronization signal and a secondary synchronization signal and the at least one other synchronization signal comprises another primary synchronization signal and another secondary synchronization signal.

8. The method of claim 1, wherein the indication is received at a predetermined frequency resource or at a resource with a predetermined offset to the at least one synchronization signal.

9. The method of claim 1, wherein the at least one synchronization signal is received from a beam and the at least one other synchronization signal is received from another beam and the beam and another beam are comprised in a sweeping beam reception.

10. An apparatus, comprising:
at least one processor; and
at least one memory including computer program code;
the at least one memory and the computer program code configured to, with the at least one processor, cause the apparatus to perform at least the following:
receive at least one synchronization signal;
receive at least one other synchronization signal;
receive an indication whether or not the at least one synchronization signal can be combined with the at least one other synchronization signal; and
if the indication indicates that the at least one synchronization signal cannot be combined with the at least one other synchronization signal, prevent from combining the at least one synchronization signal and the at least one other synchronization signal.

11. The apparatus of claim 10, wherein the indication whether or not the at least one synchronization signal can be combined with at least one other synchronization signal further indicates a symbol, subframe or timeslot of the at least one synchronization signal.

12. The apparatus of claim 10, wherein the indication whether or not the at least one synchronization signal can be combined with at least one other synchronization signal comprises an indication whether or not the at least one synchronization signal can be combined with a last previously received synchronization signal.

13. The apparatus of claim 10, wherein the indication whether or not the at least one synchronization signal can be combined with at least one other synchronization signal comprises an indication whether or not the at least one synchronization signal can be combined with a first following received synchronization signal.

14. The apparatus of claim 10, wherein the apparatus is caused to receive the indication by determining the indication from one of the following: one of two predefined signals, one of two predefined masks, and one of two predefined phase rotations.

15. The apparatus of claim 10, wherein the indication whether or not the at least one synchronization signal can be combined with at least one other synchronization signal comprises an indication of one of a symbol index, subframe or timeslot modified by one of a mask or phase rotation to indicate whether or not the at least one synchronization signal can be combined with the at least one other synchronization.

16. The apparatus of claim 10, wherein a pattern of at least one indication whether or not the at least one synchronization signal can be combined with at least one other synchronization signal is indicative of at least one of a single-beam synchronization signal without repetition, a single-beam synchronization signal with repetition, a multi-beam synchronization signal without repetition or a multi-beam synchronization signal with repetition.

17. The apparatus of claim 10, wherein the at least one synchronization signal comprises a primary synchronization signal and a secondary synchronization signal and the at least one other synchronization signal comprises another primary synchronization signal and another secondary synchronization signal.

18. The apparatus of claim 10, wherein the indication is received at a predetermined frequency resource or at a resource with a predetermined offset to the at least one synchronization signal.

19. The apparatus of claim 10, wherein the at least one synchronization signal is received from a beam and the at least one other synchronization signal is received from another beam and the beam and another beam are comprised in a sweeping beam reception.

20. A computer program product comprising at least one non-transitory computer-readable storage medium having computer-executable program instructions stored therein, the computer-executable instructions configured to, when executed, cause an apparatus at least to:
receive at least one synchronization signal;
receive at least one other synchronization signal;
receive an indication whether or not the at least one synchronization signal can be combined with the at least one other synchronization signal; and
if the indication indicates that the at least one synchronization signal cannot be combined with the at least one other synchronization signal, prevent from combining the at least one synchronization signal and the at least one other synchronization signal.

* * * * *